United States Patent
Vija et al.

(10) Patent No.: US 11,816,764 B2
(45) Date of Patent: Nov. 14, 2023

(54) PARTIAL VOLUME CORRECTION IN MULTI-MODALITY EMISSION TOMOGRAPHY

(71) Applicant: Siemens Medical Solutions USA, Inc., Malvern, PA (US)

(72) Inventors: Alexander Hans Vija, Evanston, IL (US); Michal Cachovan, Baiersdorf (DE)

(73) Assignee: Siemens Medical Solutions USA, Inc., Malvern, PA (US)

(*) Notice: Subject to any disclaimer, the term of this patent is extended or adjusted under 35 U.S.C. 154(b) by 0 days.

(21) Appl. No.: 17/662,449

(22) Filed: May 9, 2022

(65) Prior Publication Data

US 2022/0262049 A1 Aug. 18, 2022

Related U.S. Application Data

(62) Division of application No. 15/929,643, filed on May 14, 2020, now Pat. No. 11,361,478, which is a
(Continued)

(51) Int. Cl.
*G06T 11/00* (2006.01)
*G06T 7/00* (2017.01)
*G06T 7/11* (2017.01)

(52) U.S. Cl.
CPC .......... *G06T 11/005* (2013.01); *G06T 7/0012* (2013.01); *G06T 7/11* (2017.01);
(Continued)

(58) Field of Classification Search
CPC ....... G06T 11/005; G06T 7/0012; G06T 7/11; G06T 11/008; G06T 2207/10081;
(Continued)

(56) References Cited

U.S. PATENT DOCUMENTS 6,950,494 B2 * 9/2005 Vija .................. A61B 6/583
378/62
8,350,222 B2 * 1/2013 Vija ................... A61B 6/4266
250/363.05

(Continued)

OTHER PUBLICATIONS

Chan et al., ("Simultaneous partial volume correction and noise regularization for cardiac SPECT/CT"), 2013 IEEE Nuclear Science Symposium and Medical Imaging Conference (2013 NSS/MIC), Seoul, 2013, pp. 1-6 as submitted in the IDS (Year: 2013).*
(Continued)

*Primary Examiner* — Miya J Cato
*Assistant Examiner* — Pawan Dhingra (57) ABSTRACT

For partial volume correction, the partial volume effect is simulated using patient-specific segmentation. An organ or other object of the patient is segmented using anatomical imaging. For simulation, the locations of the patient-specific object or objects are sub-divided, creating artificial boundaries in the object. A test activity is assigned to each sub-division and forward projected. The difference of the forward projected activity to the test activity provides a location-by-location partial volume correction map. This correction map is used in reconstruction from the measured emissions, resulting in more accurate activity estimation with less partial volume effect.

12 Claims, 3 Drawing Sheets

Related U.S. Application Data division of application No. 15/912,629, filed on Mar. 6, 2018, now Pat. No. 10,699,445.

(60) Provisional application No. 62/491,186, filed on Apr. 27, 2017.

(52) U.S. Cl.
CPC .. G06T 11/008 (2013.01); *G06T 2207/10081* (2013.01); *G06T 2207/10084* (2013.01); *G06T 2207/10104* (2013.01); *G06T 2207/10108* (2013.01); *G06T 2207/30004* (2013.01); *G06T 2211/424* (2013.01)

(58) Field of Classification Search
CPC . G06T 2207/10084; G06T 2207/10104; G06T 2207/10108; G06T 2207/30004; G06T 2211/424

See application file for complete search history.

(56) References Cited

U.S. PATENT DOCUMENTS

| | | | |
|---|---|---|---|
| 8,577,103 B2 | 11/2013 | Vija et al. | |
| 8,675,936 B2 | 3/2014 | Vija et al. | |
| 2010/0014730 A1* | 1/2010 | Hahn | G06T 5/001 |
| | | | 382/128 |
| 2013/0267841 A1* | 10/2013 | Vija | G06T 7/11 |
| | | | 382/131 |
| 2017/0091574 A1* | 3/2017 | Udupa | G06T 7/136 |
| 2017/0228897 A1* | 8/2017 | Holt | G06T 11/008 |
| 2018/0033166 A1* | 2/2018 | Cachovan | G06T 11/006 |

OTHER PUBLICATIONS

Erlandsson, Kjell, et al. "A review of partial volume correction techniques for emission tomography and their applications in neurology, cardiology and oncology." Physics in Medicine & Biology 57.21 (2012): R119.

C. Chan, H. Liu, Y. Grobshtein, M. R. Stacy, A. J. Sinusas and C. Liu, "Simultaneous partial volume correction and hoise regularization for cardiac SPECT/CT," 2013 IEEE Nuclear Science Symposium and Medical Imaging Conference (2013 NSS/M IC), Seoul, 2013, pp. 1-6. (Year: 2013).

* cited by examiner

PARTIAL VOLUME CORRECTION IN MULTI-MODALITY EMISSION TOMOGRAPHY

CROSS-REFERENCE TO RELATED APPLICATIONS

This application is a divisional of U.S. patent application Ser. No. 15/929,643, filed May 14, 2020, which is a divisional application of U.S. Pat. No. 10,699,445, granted Jun. 30, 2020, and claims the benefit of U.S. Provisional Patent Application Ser. No. 62/491,186, filed on Apr. 27, 2017, the disclosures of which are incorporated herein by reference.

BACKGROUND

The present embodiments relate to emission tomography. In emission tomography, an added radioisotope in a patient gathers at locations of metabolic function. The added radioisotope causes emissions. The emission tomography system detects the emissions. Various approaches for detecting emissions may be used, such as Single Photon Computed Tomography (SPECT) or Positron Emission Tomography (PET). The detected emissions are reconstructed from a space defined by the detector to an image or object space representing the activity distribution relative to the patient.

The activity concentration or counts may be underestimated due to the partial volume effect. The measured activity as reconstructed is less than the actual activity for small volumes with linear dimensions less than roughly 3 times the full width half maximum (FWHM) of the effective point spread function (PSF) of the detector (i.e., the emission tomography imaging system). Discretization may also cause edge voxels to involve a mix of different tissues. Due to the partial volume effect, the reconstructed activity concentration near edges of organs or other objects may be lower than the actual activity concentration.

The partial volume effect may be corrected, in part, by incorporation of the PSF into the system matrix used for forward and back-projection, but this correction may be limited. The partial volume effect may be corrected using anatomical information. The tissue is divided into regions of uniform function, which assumes little variation in the same type of tissue. Voxels in different regions are then corrected, but this approach requires segmentation of different tissues. The correction occurs post reconstruction by scaling of activity in a volume. The scaling factor is known from calibration measurements. Voxel based approach also use anatomy. These approaches are generic.

SUMMARY

By way of introduction, the preferred embodiments described below include methods, systems, instructions, and computer readable storage media for partial volume correction. The partial volume effect is simulated using patient-specific segmentation. An organ or other object of the patient is segmented using anatomical imaging. For simulation, the locations of the patient-specific object or objects are sub-divided, creating artificial boundaries in the object. A test activity is assigned to each sub-division and forward projected. The difference of the forward projected activity to the test activity provides a location-by-location partial volume correction map. This correction map is used in reconstruction from the measured emissions, resulting in more accurate activity estimation with less partial volume effect.

In a first aspect, a method is provided for partial volume correction in an emission tomography system. Computed tomography (CT) data representing a region of a patient is obtained. Locations representing an organ are segmented based on the CT data. The locations are a zone. The locations representing the organ are sub-divided. A test activity is assigned into each of the sub-divisions. The assigned test activities are forward projected into a partial volume distribution. For each of the locations, a partial volume correction is determined from a ratio of a reconstructed activity from the partial volume distribution to the test activity. Detected emissions, from the region of the patient, of the emission tomography system are reconstructed using the partial volume corrections. An image of the detected emissions is generated based on an output of the reconstructing.

In a second aspect, a method is provided for partial volume correction in an emission tomography system. A partial volume effect is simulated based on a shape of an object in a patient. Corrections by locations are determined for the partial volume effect of the object in the patient. The emission tomography system detects emissions from the object in the patient. An activity distribution of the object is reconstructed from the detected emissions. The reconstruction is a function of the corrections. An image of the activity distribution is generated.

In a third aspect, a multi-modal medical imaging system is provided. A medical imaging system is configured to detect signals from a patient. An emission tomography system is configured to detect emissions from the patient. An image processor is configured to reconstruct an object of the patient from the detected emissions using a partial volume correction map for the object based sub-division of an organ segmentation from the signals. A display is configured to display an image of the reconstructed object.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Partial volume correction is provided for multi-modal emission tomography. The partial volume effect is a problem in many areas of quantitative functional imaging, hindering absolute quantitative uptake measures used in clinical practice. The partial volume effect is corrected based on anatomical information. Extra modal information is used in emission reconstruction. A solution may be approximated for applications where the assumption of uniformity within the bounding region and impenetrability of the bounding region are fulfilled, such as is the case in nuclear neurology. Using artificial boundaries, the partial volume effect for the patient-specific anatomy may be simulated. The simulation is compared with the expected to create corrections.

In one embodiment, extra-modality information, such as from computed tomography or magnetic resonance, is used for partial volume correction. The object of interest is segmented using information from the anatomical modality (i.e., extra modality information). Information from the functional modality may also be used for segmentation. The segmentation creates a zone map, such as a union zone map from anatomical and functional modalities. Uniform but distinct concentrations are assigned to spheres or other shapes inscribing the object with a random placement, creating artificial boundaries within the object. The spheres or shapes touch, but do not overlap, but overlapping or non-touching may be used Minimum and/or maximum sizes (e.g., diameters or volumes) may limit the spheres or shapes. Poisson noise commensurate with the tomographic data is added in a forward projection. A test activity is provided for each sphere or shape sub-dividing the segmented object. The assigned test activities are reconstructed. The imaging process is simulated from activity assigned to the inscribed spheres. The correction is derived from the simulation or looked up from a table based on results of the simulation. The partial volume correction is deduced or computed for each sphere or shape in a zone as a ratio of the reconstructed volume and the input volume. A smooth map is created from the ratios, and the partial volume correction zone map is then applied in a multiplication to the reconstruction of the actual data or a correction in image space in iterations of the reconstruction.

Artificial test activity in a multi-modal, segmented volume and an accurate system matrix or projection operator are used to compute a response of the system in bounded segments of dimensions small enough to exhibit the partial volume effect. The better the model of the system (e.g., the point spread function (PSF)), the better the result. In quantification SPECT, a measured PSF is used for the collimator response, which includes also septal penetration. Septal penetration is also a type of spill in, spill out effect and contributes to a lowering and/or increase in activity.

The model assumes a hard boundary and uniform uptake. Modification may occur by using gradual boundary transition and/or correction factors for non-homogenous distributions in each test volume. The effects of motion are handled separately, such as using intra-reconstruction motion correction. The partial volume correction and motion correction are complimentary.

The partial volume correction based on simulating the partial volume effect by sub-division of the object of interest is applied in any type of emission tomography. For example, PET or SPECT applies the partial volume correction. Other types of nuclear medicine imaging may use the partial volume correction.

Figure 1:
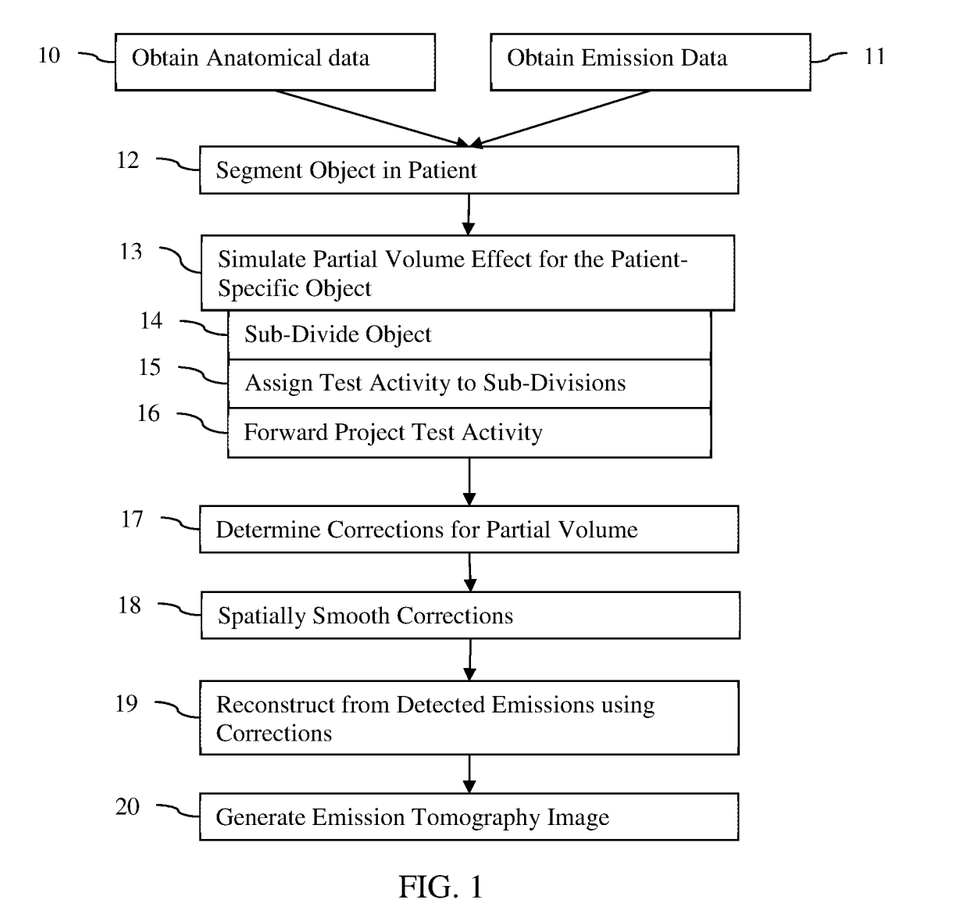
FIG. 1 is a flow chart diagram of one embodiment of a method for partial volume correction in an emission tomography system.

FIG. 1 shows one embodiment a method for partial volume correction in an emission tomography system. A zone map for partial volume correction is generated from a difference between (1) activity of a reconstruction of a sub-divided region of interest or object assigned a simulation activity and (2) the simulation activity. The partial volume correction zone map is used in reconstructing emissions from the patient.

Figure 5:
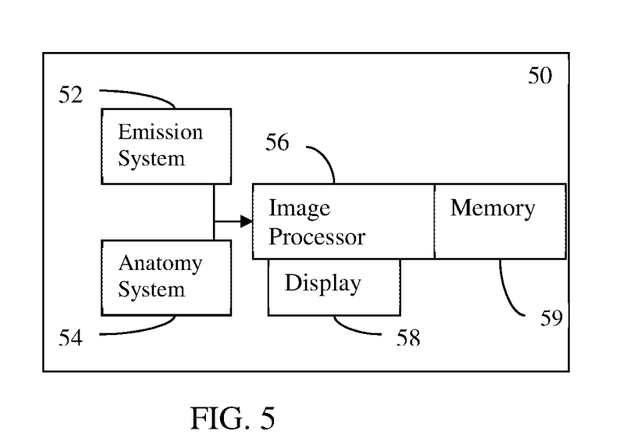
FIG. 5 is a block diagram of one embodiment of a multi-modality system for partial volume correction.

The method of FIG. 1 is implemented using the system of FIG. 5, an image processor, a computer, a CT scanner, an MR scanner, a SPECT imager, a PET imager, a server, and/or other device. For example, a CT or MR scanner performs act 10, and a SPECT or PET imager performs act 11. A computer or image processor of one of the scanners or imagers performs acts 12-20.

The method is performed in the order shown (numerical or top to bottom), but other orders may be used. For example, acts 10 and 11 are performed simultaneously or in any sequence. As another example, acts 13-17 are repeated using different sub-divisions of act 14 prior to performing act 18 or 19.

Additional, different, or fewer acts may be provided. For example, the CT data is used for attenuation correction and/or zonal reconstruction. In another example, motion correction is performed. As another example, the generation of the image in act 20 and/or the spatially smoothing of act 18 is not performed. In yet another example, the corrections are compared to a characteristic curve of recovery as a function of size as a check for proper correction determination or to constrain the recovery coefficients (i.e., partial volume corrections).

In act 10, an imaging modality different than emission tomography obtains anatomical information for the patient. Any imaging modality may be used, such as CT, magnetic resonance (MR), or ultrasound. The modality scans the patient to provide anatomical information about the patient in a same region from which emissions are to be detected by emission tomography.

Where zonal reconstruction is used to provide higher resolution reconstruction, the measures of emissions are separated into zones for the reconstruction. The anatomical information may be obtained for creating the zones. The zones represent locations within the examined patient and are derived from the anatomical information. The multi-modal reconstruction may improve the image quality and/or reduce the acquisition time of the emission imaging process by considering the zonal information in the reconstruction.

Figure 2:
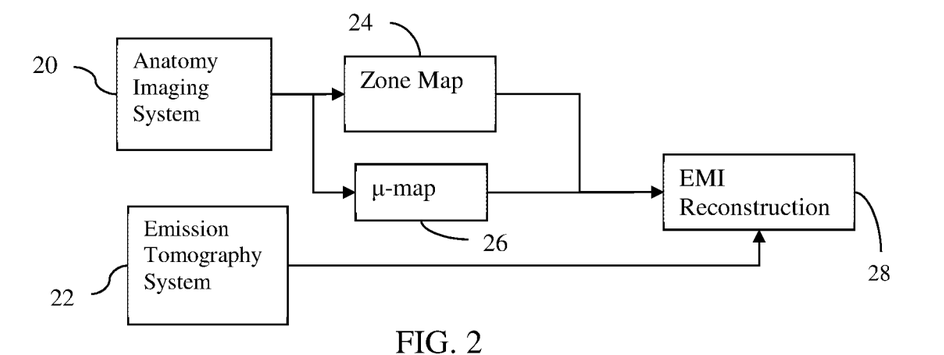
FIG. 2 is a flow chart diagram of an example method for multi-modal emission tomography reconstruction.

FIG. 2 shows a process flow for extra-modality information (EMI) reconstruction using zonal reconstruction. An emission tomography system 22 detects emissions from the patient. The anatomy imaging system 20 detects signals from the patient based on x-ray, magnetic resonance, or ultrasound scanning. The anatomy information is used to create a μ-map for attenuation correction and a zone map for zonal reconstruction. The detected emissions are reconstructed using the μ-map and the zonal reconstruction map. The detected emissions are reconstructed into object or image space representing activity concentration or distribution from the patient. Alternatively, zonal reconstruction is not provided, so the zone map 24 for zonal reconstruction is not created.

In one embodiment, the support or anatomical information is obtained as CT data. The CT data is acquired by scanning the patient, by transfer, or from memory. A CT scanner (e.g., the anatomy imaging system 20) scans the patient using a protocol (scan sequence), such as by transmitting x-rays and detecting the x-rays passing through the patient from different angles.

The CT data, reconstructed from the CT scanning, represents the same region of the patient as the detected emissions. The fields of view may be the same or different, such as overlapping. The CT data represents anatomical information about the examined patient (e.g., shape, volume, thickness, and/or density of tissue types).

The measurements for the CT data are Hounsfield (HU) measurements. For x-ray CT, the transmission spectrum is an attenuated Bremsstrahlung spectrum and thus continuous and depends upon the particular CT scanner and the attenuating body. The HU measurements are used to represent anatomy. Alternatively, the CT data is converted to linear attenuation coefficients. A μ-map is generated from the CT information. The conversion adapts the structural or support information to the CT scanner, the patient, and/or the protocol (see U.S. Pat. No. 6,950,494). Any conversion to a μ-map may be used but is adaptive for best results. This μ-map is used for attenuation correction in emission tomography.

Because linear attenuation coefficients may more accurately represent different types of tissue than absorption measures despite differences in patient, protocol, and/or CT scanner, the μ-map may be used for tissue segmentation. CT data in HU measurements is used for segmentation in other embodiments.

In act 11, an emission tomography system obtains emissions data. SPECT or PET emission detection is performed on a patient. In alternative embodiments, other functional imaging is performed, such as fMRI or fCT. The emissions data is measurements or counts of emissions from a patient.

The emission data is obtained from detection, from data transfer, or from memory. An emission tomography system provides the emission data directly by detecting from a patient or indirectly by transfer or loading.

The activity concentration in a patient having received a radiotracer or radiotracers is determined as part of reconstruction by the emission tomography system. After ingesting or injecting the radiotracer or tracers into the patient, the patient is positioned relative to an emissions detector, and/or the detector is positioned relative to the patient. Emissions from the radiotracer or tracers within the patient are detected over time. A collimator in front of the detector limits the direction of photons detected by the detector, so each detected emission is associated with an energy and line or cone of possible locations from which the emission occurred. The lateral position of the line or cone relative to the detector may likewise be determined.

Raw emission data or preprocessed data is provided for multi-modal or other reconstruction. The multimodal reconstruction may use a system matrix or projection operators to describe the properties of the emission tomography imaging system to iteratively improve a data model of an image object representing the emission data. The image object may then be displayed using volume rendering or other imaging techniques.

The image object, which is defined in an object or image space, is a reconstruction of the emission data measured in a data space. The object space is the space in which the result of the image reconstruction is defined and which corresponds, for example, to the 3D volume (i.e., field-of-view or "FOV") that is imaged.

The anatomy data and emission data are co-registered to provide registration. For example, anatomical CT data is co-registered with a preliminarily reconstructed image object. In other embodiments, a multi-modality system is used, allowing the emission data and the anatomy data to be obtained with the patient in the same position. The spatial relationship of the emission tomography system to the anatomy imaging system is known or calibrated.

In act 12, an image processor segments locations representing an organ based on the anatomical data. The segmentation identifies locations representing an object of interest in the patient, such as a specific organ. The group of locations representing the same object is a zone. A tissue-based zone map is generated. For example, the voxels or locations representing a liver are identified. Any organ, part of an organ, type of tissue, or other object in a patient may be segmented.

In zonal reconstruction, CT, MR, or other data representing the patient (e.g., μ-map or attenuation) is used to identify one or more zones. A zone need not be an enclosed area. The zone is continuous or discontinuous. The zones define spatial regions associated with a given grouping of one or more types of tissue. One zone may represent a target organ or target tissue of the biomarker used for the functional image. Any number of zones may be identified. Each zone is defined by locations in the volume at which that type of tissue occurs.

The zone for the organ or object of interest provides a segmentation for that object. To segment the object-of-interest, the zone map may be used to identify the locations for a given zone or object. Alternatively, the CT or other data is segmented to define the locations for the object, such as the liver. Any segmentation may be used, such as template matching, thresholding, and/or machine-learnt classification.

In one embodiment, both the anatomical data and the emission data are used for segmentation. The anatomical data is used to identify locations of the object. The emission data is used to identify tumors or lesions within the object. An initial reconstruction from the emission data shows locations of higher (e.g., above a threshold) or other abnormal activity. After any low pass filtering and/or clustering, locations corresponding to one or more tumors or relatively higher activity concentration are identified. The segmentation includes locations of the object and excludes locations in the object that are tumors or lesions. Other segmentation using other data may be used.

In act 13, the image processor simulates the partial volume effect. The shape of the object-of-interest in the patient is used in the simulation. The simulation determines the partial volume effect for the patient-specific object or segmentation. In one embodiment, by sub-dividing the locations for the object, the partial volume effect may be simulated in a patient-specific manner. A test activity is assigned to each of the sub-divisions. Since the sub-divisions do not include all of the locations of the object, forward projecting the assigned test activities to the object or image space indicates the level of decrease in activity concentration or count due to the partial volume effect. The simulation of emission imaging based on assigned or know activity provides an indication of the partial volume effect by location.

Figure 3:
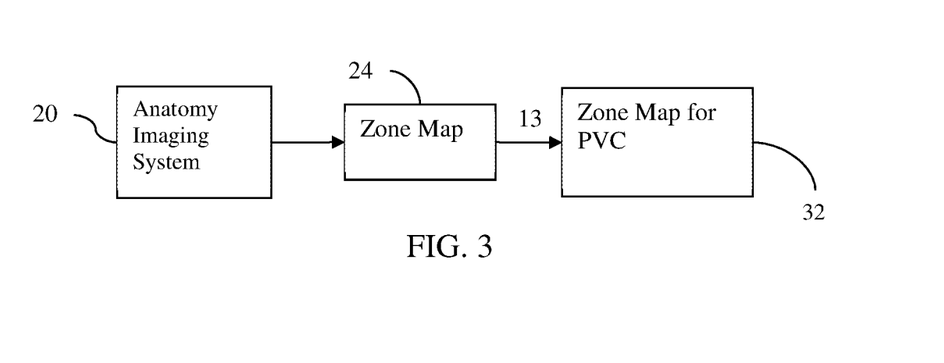
FIG. 3 is a flow chart diagram of one embodiment of a method for generating a zone map for partial volume correction.

FIG. 3 shows one embodiment where simulation is used to create a zone map 32 for partial volume correction. The anatomy imaging system 20 provides anatomy data, which is used to create a zone map 24 for reconstruction. The zone map 24 includes identification of locations belonging to an object of interest, such as an organ. The simulation of act 13 is used to create a zone map 32 of partial volume corrections from the zone map 24. Act 17 is performed based on results of the simulation to create a map of corrections as a function of location. Different locations, such as near a boundary of the object, have different corrections, based on the simulation of act 13.

Acts 14-16 represent one embodiment of the simulation of act 13 based on a shape of an object in a patient. Additional, different, or fewer acts may be used to simulate.

In act 14, the image processor sub-divides the locations representing the object of interest. The sub-division creates artificial borders. Shapes are fit into the segmentation, providing for gaps between the shapes. For example, spheres are fit into the segmentation, providing for some locations within the spheres and other locations not within the spheres. Other shapes may be used, such as ovals or prisms. A predetermined pattern, such as checkerboard pattern or triangulation, may be used.

The segmentation defines the volume into which the shapes are fit. The sub-division is based on the zone or zones. The zone for the object of interest defines the volume into which the shapes are fit. Zones for tumors or lesions within the volume of interest may be excluded, such that the shapes sub-dividing the locations do not include locations of the tumors or lesions.

The shapes are fit to the segmentation. Delaung tessellation or inscribing of spheres is used to fill the segmentation in one embodiment. Alternatively, source distance, span, or colocation mapping is used.

The sub-divisions have minimum sizes, such as a diameter of a sphere corresponding to one or more voxels (e.g., a factor of 1 or greater of a resolution of the emission tomography system) or a minimum volume of a measured characteristic curve of the system. A maximum size may be used. Alternatively, the maximum size is limited by the segmentation. The shapes do not overlap but may touch.

In one embodiment, a sphere as large as possible is fit within the segmentation. Another sphere as large as possible within the segmentation and not overlapping with the previously fit largest sphere is fit. The process continues until there is not a group of locations as large as the minimum sphere size. Other fitting may be used, such as fitting a threshold number of spheres and then discontinuing the sub-division.

In another embodiment, random seeding is used. A location within the object is randomly selected. As large a sphere as possible centered at that location and not overlapping with the border of the object or any other fit spheres is placed. The process (i.e., random location selection and sphere fitting) is repeated for locations within the object not yet assigned to a sub-division (i.e., sphere). The process ends when no more spheres of the minimum size may be fit or after a threshold number of random seed selections fail to find locations for a sphere with a minimum size.

Figure 4:
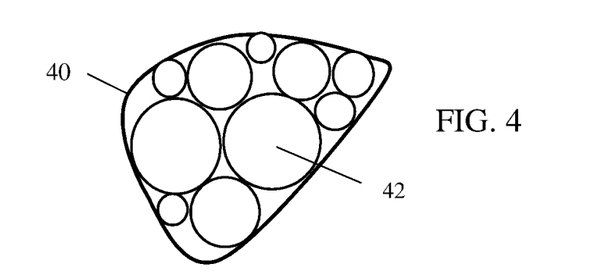
FIG. 4 illustrates an example sub-division of an organ segmentation.

FIG. 4 shows an example. The border 40 from the segmentation is of a liver. Based on randomized location selection, a plurality of spheres 42 are fit within the border 40. The sub-division creates artificial borders within the object. Each sphere creates an artificial border. The groups of locations within the border 40 and not within a sub-division (i.e., within a sphere 42) are not large enough to fit a minimum sized sphere. In other embodiments, the size of the spheres is randomized. Other fitting using randomization or without randomization may be used.

The edges of tumors, the border 40, and/or the volume shapes (e.g., spheres 42) may be made diffuse. Rather than having binary edges, the edges include gradients gradually transitioning locations within to locations outside of the tumor, object, or sub-division. This diffuse assignment may be used to weight assigned activity concentration in act 15.

In act 15, the image processor assigns a test activity into each of the sub-divisions. For example, a test activity is assigned to each of the spheres 42. The test activity is a known activity within the boundaries defined by the sub-division.

Where the segmentation includes locations of a tumor or other lesion, the tumor or other lesion may be excluded from the sub-division. Thus, the test activity is not assigned to the tumor or other lesion locations despite those locations likely having a higher activity concentration in the patient. In alternative embodiments, the tumor or other locations are assigned the test or another activity, each being treated as a separate sub-division.

The same test activity is assigned to each of the locations in the sub-divisions. The test activity is a distribution, such as Poisson noise shaped to fit into the sub-division or commensurate with the tomographic data. In one embodiment, the test activity is uniform within each sub-division and the same amplitude or count is provided at each location within each of the sub-divisions. Other test activity distributions may be used.

In one embodiment, the assigned test activity is scaled after or as part of assignment. The scaling alters the count by location, such as by sub-division. The activity for some locations is greater than the activity for other locations. The user inputs an indication of a level of heterogenicity by location. The user may input different levels of a heterogenicity factor at a sub-set of different locations, and the image processor interpolates and/or extrapolates the heterogenicity factor at other locations. Alternatively, the user assigns the heterogenicity factor to each sub-division or by sub-region (i.e., divisions other than the division used for assigning test activity).

The assigned test activities for the various locations within the segmentation form an activity field. Test activity is not assigned outside of the segmentation (e.g., no activity outside of the organ) and is not assigned in the gaps between sub-divisions within the segmentation. This field of test activities forms a known activity spatial distribution in object space.

In act 16, the image processor forward projects the assigned test activities into projection space. The forward projection performs a simulation of the detection process (i.e., projection generation given the emission distribution). The activity distribution of the test activities is forward projected to form measurements.

These measurements are reconstructed into the object space. Reconstruction from the forward projected test activities is performed. The reconstruction and partial volume estimation may be performed iteratively, so the emission system model is used in an iterative optimization to reconstruct the test activity distribution into object space. The reconstruction uses the parameter values or settings for reconstructing the emissions measured from the patient. For the simulation, the assigned or known activity from all the sub-divisions together is used instead of the measured emissions.

The forward projection creates a partial volume distribution. The partial volume distribution has the partial volume effect. The reconstructed activities will be different for some locations due to the partial volume effect. The locations and activity concentration are in the object space, so provides a spatial distribution of activities. The forward projection simulates the detection process, which is the cause of the partial volume effect, such as assigning a non-zero activity level at locations outside of the sub-divisions and resulting in activity levels for some locations in the sub-divisions to be lower.

The forward projection provides a noise free estimate of the detection in the projection space. In order to simulate noise, Poisson noise is imposed on the data. The Poisson noise distribution follows statistics of the original projection data acquired on the system.

In act 17, the image processor determines corrections for the partial volume effect. The partial volume effect is represented by the difference in activity concentration after forward projection as compared to the assigned activity concentration. The artificial boundaries cause the partial volume effect. The difference provides a correction to counteract the partial volume effect.

The corrections for the various locations form a zone map for partial volume correction. For each location, the activity after forward projection is compared to the test or assigned activity. The difference is a correction for the partial volume effect. Any difference may be used, such as a mathematical difference (subtraction). In one embodiment, a ratio of the assigned activity, b, to the activity, $\hat{b}$, output from reconstruction of the assigned activity is used. For example, the correction for locations in a given sub-division are the same. For each sub-division (e.g., sphere) i, the partial volume correction, PVC, is:

$$PVC_i = 1 \Big/ \frac{\hat{b}_i}{b_i}$$

Other difference functions may be used. Other terms may be included, such as a constant or variable for adjusting an overall level of correction.

For each location, a partial volume correction is determined. The corrections for locations of the object (e.g., organ) have a spatial distribution, so a zone map for partial volume corrections is provided. The partial volume correction zone map provides a distribution of gain counteracting the partial volume effect. The gain is additive or multiplicative. For the ratio, the gain is multiplicative.

Where a single iteration is used, the map may include artifacts from the sub-division. A nearest neighbor sampling, low pass filtering, interpolation, or other process may be used to reduce or remove the artifacts.

Alternatively, the sub-division is repeated. Since the partial volume effect is responsive to the sub-division, act 13 (i.e., acts 14-16) and act 17 may be repeated. The segmentation locations are sub-divided differently, creating different artificial boundaries. For example, the random generation of the sub-division is repeated. The same or different activity is assigned to the sub-divisions, and forward projected. The corrections based on the simulation with different sub-divisions are determined. Any number of repetitions may be used, such as creating two or more, tens, or hundreds of partial volume correction zone maps.

The different partial volume correction zone maps have the same or different corrections (e.g., ratios) for a given location. The corrections for each location are averaged. The result is a partial volume correction zone map where the correction for each location is an average for corrections from different sub-divisions of the object. Other combinations may be used, such as weighted averaging where weights are applied based on whether the location is within or outside of the shape to which activity was assigned.

In one embodiment, the corrections are checked. A recovery curve for the emission tomography system is measured or provided. The recovery curve represents the recovery coefficient for the system as a function of size of an object. The corrections may be compared to the recovery curve. Given the size of the object (e.g., the liver), the corrections should be within a range or threshold difference from the recovery coefficient for that size. Other checks or no check may be performed.

In act 18, the image processor filters the partial volume correction zone map. The corrections as a function of location are low pass filtered or spatially smoothed. Outliers in amplitude of correction may be removed, replaced, or reduced based on surrounding corrections. Alternatively, no spatial smoothing is applied.

In act 19, the image processor reconstructs the activity distribution of the object from the detected emissions. The simulation uses assigned emissions. For functional imaging of the patient, the detected or measured emissions from the patient (i.e., from the object) are reconstructed into object space. Any reconstruction may be used. In an iterative optimization, a model of the emission tomography system is used to forward project measurements to object space, and residuals are back projected for correcting a data model for the next iteration.

The reconstruction is a function of the partial volume corrections. The partial volume correction zone map, such as the spatially smoothed zone map generated from multiple repetitions of the simulation, is used in the reconstruction. In one embodiment, the activities prior to or as part of forward projection are multiplied by the corrections. The emissions for each measurement are multiplied by a forward projection of the corrections. In another embodiment, the corrections are applied in the image or object space within the reconstruction. After the forward and back projections, the corrections are applied to the activities in the respective locations. Using the partial volume correction zone map as a post-processing in the object or image space may introduce noise. The correction is applied in each iteration. Other applications of the corrections may be used.

In one embodiment, both the partial volume correction zone map and the zone map for reconstruction are applied. The zone map for reconstruction distinguishes between different tissue or tissue types. The image processor zonally reconstructs an image object from the detected emissions and the anatomical information. Any zonal reconstruction may be used. For example, one of the zonal reconstructions disclosed in U.S. Published Patent Application Nos. 2010/0014730 or 2013/0267841 is used. The zonal reconstructions use multi-modal reconstruction to improve image quality. In multi-modal reconstruction, the anatomical information is segmented into zones. A zone is a 3D region of similar anatomical tissue. The segmentation is performed using an anatomical modality, such as CT. For example, bone tissue is segmented from non-bone tissue. Segmentation is provided by simple thresholding segmentation, gradient analysis, filtering, random walker, or other image processing based on the CT data. For CT, the segmentation is based on the measured units in CT, the Hounsfield (HU) scale, or based on linear coefficients of a μ-map.

In the multi-modal reconstruction, a functional image of an examined object is reconstructed by considering the spatial or spatial-temporal structure of the object when approximating the functional image according to the acquired emission data. The structure of the object allows separating the object into multiple zones. Each organ or type of tissue is assigned to a separate zone. The volume within each of those zones is treated separately and equally in the reconstruction. Rather than equal treatment, the independence of the zones may be used for different treatment for different zones. Different amounts of signal are allocated to the zones according to the zone's contribution to the functional feature observed.

Multimodal reconstruction may impose a separation in anatomical zones of the reconstructed image object, but the zones do not modify the merit function of the applied reconstruction algorithm. The different zones are separately forward projected and renormalized as part of the iterative reconstruction. The result of multi-modal reconstructions may be increased resolution as compared to reconstruction with the functional information without multi-modal, even with attenuation correction.

In act 20, an image is generated from an image object output by the reconstruction. The reconstruction outputs an image object or volume representing the patient from a last iteration. This final image object is used for generating an image. The image object is a three-dimensional representation of the detected emissions or activity distribution of the patient. Due to partial volume correction, the counts or activity concentration for each voxel or location is more accurate. The resulting image is used for diagnosis or prognosis, which is improved by the increased accuracy of the emission tomography system.

The image object is rendered or otherwise used to generate an image. For example, a multi-planar reconstruction or single slice image of a plane is generated. The intersection of one or more planes with the image object is visualized. As another example, a surface or projection rendering is performed for three-dimensional imaging. Other imaging may be used.

One image is generated. Alternatively, a sequence of images is generated. For example, image objects from different time periods are used to generate a sequence of images representing the patient over time.

The image of the functional information from the multi-modal reconstruction is displayed alone. Alternatively, an anatomical image is displayed with the functional image. For example, the functional image is overlaid on a CT image. The overlay may be colored for display on a gray scale CT image. Other combinations may be used.

For quantitative SPECT, the image may be an alphanumeric text of a specific uptake value for a location. A graph, chart, or other representation of uptake at multiple locations may be output. The spatial image representing distribution of uptake may use color or brightness modulation to represent a level of uptake by location.

FIG. 5 shows one embodiment of a multi-modal medical imaging system 50. The system 50 implements multi-modal reconstruction with partial volume correction based on patient-specific anatomy. The method of FIGS. 1 and/or 3 or another method is implemented. By simulating the partial volume effect for the emission tomography system 52 based artificial division of an object-of-interest, corrections are determined to counter the partial volume effect. The corrections are applied in reconstruction of measured emissions. The result is a more accurate activity concentration for locations in the object-of-interest. The emission tomography system 52 operates better. Diagnosis and/or prognosis may benefit from the more accurate information.

The system 50 includes an image processor 56, an emission imaging system 52, anatomy imaging system 52, a memory 59, and a display 58. Additional, different, or fewer components may be provided. In one embodiment, the image processor 56, memory 59, and/or display 58 are part of one of the emission imaging system 52 or the anatomy imaging system 52. In alternative embodiments, the image processor 56, memory 59, and/or display 58 are provided as a workstation, server, or computer separate from the imaging systems 52, 54. The memory 59 is part of a computer or workstation with the image processor 56 or is a remote database, such as a picture archiving and communications system (PACS).

The anatomy imaging system 52 is a CT, MR, ultrasound, or other diagnostic medical imaging system. The anatomy imaging system 52 scans a patient with x-rays, ultrasound, or electric pulses to image the anatomy of the interior of the patient. A source transmits energy to the patient. A detector receives signals responsive to the transmitted energy. Any now known or later developed anatomy imaging system 52 may be used. While "imaging" is used herein, the anatomy imaging system 52 may be used to acquire anatomy data representing the patient without generating or displaying an image on a display device.

In one embodiment, the anatomy imaging system 52 is a CT system. An x-ray source and detector are mounted on a moveable gantry. The x-ray source generates x-rays, some of which pass through the patient. The detector detects the transmitted x-rays that pass through the patient. The energy used, timing, scan angles, and/or other aspects of the CT scan are set for a patient and used to scan a volume or other region of the patient.

The emission imaging system 52 is any now known or later developed SPECT or PET scanner. The emission imaging system 52 includes a detector for detecting emitted radiation from within the patient. For SPECT, a gamma camera is used to detect. The detector detects photon emissions. The detector detects the photons. A given detector may detect a sequence of events from the same or different locations of the patient.

The image processor 56 is a general processor, central processing unit, control processor, graphics processor, digital signal processor, application specific integrated circuit, field programmable gate array, amplifier, comparator, time-to-digital converter, analog-to-digital converter, digital circuit, analog circuit, timing circuit, combinations thereof, or other now known or later developed device for reconstructing a patient volume (i.e., object of the patient) from detected emissions. The image processor 56 is a single device or multiple devices operating in serial, parallel, or separately. The image processor 56 is specifically designed or provided for reconstruction but may be a main or general processor of a computer, such as a laptop or desktop computer, or may be a processor for handling tasks in a larger system. The image processor 56 may perform segmentation, partial volume effect simulation, partial volume correction determination, and/or reconstruction. The image processor 56 may perform other functions.

The image processor 56 is configurable. The image processor 56 is configured by software, firmware and/or hardware. Different software, firmware, and/or instructions are loaded or stored in memory 59 for configuring the image processor 56.

The image processor 56 is configured to reconstruct an object representing the patient from the detected emissions. The reconstruction may include zonal reconstruction. The CT data from the CT system 28 is used to segment or identify different zones or tissue types, which are then used in reconstruction. Alternatively, zonal reconstruction is not used.

The image processor 56 is configured to use a partial volume correction map for the object in the reconstruction. The partial volume correction map is generated based on segmentation from the signals or anatomy data of the anatomy imaging system 54. The signals are used to identify locations or a volume corresponding to an object-of-interest.

The locations of the anatomy are divided into sub-parts by the image processor 56. The volume representing the object is separated by inscribing spheres or other division creating locations within and locations outside of the sub-parts. For example, random assignment of maximally-sized shapes within a segmentation of the object and without overlap with others of the maximally-sized shapes is used. Once the maximally-sized shapes are at and/or below a minimum size, the random assignment ends, leaving gaps between the sub-parts.

The image processor 56 assigns activity to the sub-parts. The same activity is assigned to each sub-part. The activity is uniform but may have other distribution within the locations of each sub-part. The activity is simulated rather than being measured activity.

To generate the partial volume correction map, the simulated activities of the sub-parts are reconstructed. Forward projection is applied in the reconstruction. The reconstruction optimization is performed using the simulated activities for all the sub-parts. The resulting activity as a function of location (e.g., as a function of sub-part) is compared to the assigned simulation activity for the sub-part. A difference, such as a ratio, of the simulation activity and the reconstructed activity provides a correction. The image processor 56 determines an amount of change due to the partial volume effect. The amount of change by location (e.g., by sub-part) is a partial volume correction map.

The image processor 56 applies the partial volume correction map in the reconstruction. The correction map is applied as part of forward projection, such as multiplying activities in the forward projection. Alternatively, the correction map is applied as a post process, such as correcting activity in image or object space at the end of each iteration forming the object in object space.

The display 58 is a monitor, LCD, plasma, touch screen, printer, or other device for displaying an image for viewing by a user. The display 58 shows one or more images representing function (i.e., representing the activity of the reconstructed object), such as uptake or activity concentration. The image is a quantitative or qualitative SPECT or PET image. The image may be a volume rendering, a multi-planar reconstruction, a cross-section, and/or other image from a final image object. The image represents a distribution of the radionuclide in the patient based on detected emissions from the emission system 52.

The memory 59 is a random access memory, graphics processing memory, video random access memory, system memory, cache memory, hard drive, optical media, magnetic media, flash drive, buffer, database, combinations thereof, or other now known or later developed memory device for storing data. The memory 59 stores detected emissions (e.g., PET or SPECT detected event data), signals from anatomy scanning (e.g., CT data), zone information, segmentation information, partial volume effect, smoothing filter coefficients, test activity, reconstructed activity, and/or reconstruction information. The memory 59 stores data as processed, such as storing a segmentation, sub-division of the segmentation, assigned test activities, forward projection of the assigned test activities, a difference (e.g., ratio of test to reconstructed activities), reconstruction from detected emissions, image objects, a rendered image, and/or other information.

The memory 59 or other memory is a non-transitory computer readable storage medium storing data representing instructions executable by the programmed image processor 56 for reconstruction. The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A multi-modal medical imaging system comprising:
a medical imaging system configured to detect signals from a patient;
an emission tomography system configured to detect emissions from the patient;
an image processor configured to reconstruct an object of the patient from the detected emissions using a partial volume correction map for the object based on sub-division of an organ segmentation of an organ, the organ segmentation being from the signals, the sub-division being sub-parts of the organ; and
a display configured to display an image of the reconstructed object.

2. The multi-modal imaging system of claim 1 wherein the image processor is configured to generate the partial volume correction map from differences, by location, of a reconstruction of the object from simulated activity for the sub-parts corresponding to the sub-division and simulated activity for the sub-parts.

3. The multi-modal imaging system of claim 2 wherein the image processor is configured to determine the sub-parts based on random assignment of maximally-sized shapes within the segmentation, without overlap, and above a minimum size.

4. The multi-modal imaging system of claim 2 wherein the image processor is configured to determine the sub-parts based on artificial boundaries in the object.

5. The multi-modal imaging system of claim 2 wherein the organ segmentation is based on computed tomography data as the signals and the detected emissions, the organ segmentation accounts for a boundary of the organ from the computed tomography data and a tumor in the organ from the detected emissions, wherein locations for the tumor are excluded from locations of the sub-division and not assigned the simulated activity.

6. The multi-modal imaging system of claim 2 wherein the image processor is configured to scale the simulated activity by location based on user input heterogenicity factors.

7. The multi-modal imaging system of claim 1 wherein the image processor is configured to reconstruct using the partial volume correction map with multiplication in forward projection of the detected emissions by corrections of the partial volume correction map.

8. The multi-modal imaging system of claim 1 wherein the image processor is configured to reconstruct by application of the partial volume correction map to activity in image space in each iteration of the reconstruction.

9. The multi-modal imaging system of claim 1 wherein the medical imaging system comprises a computed tomography system, and wherein the emission tomography system comprises a positron emission tomography system.

10. The multi-modal imaging system of claim 1 wherein the image processor is further configured to spatially smooth partial volume corrections and reconstruct from the spatially smoothed partial volume corrections.

11. The multi-modal imaging system of claim 1 wherein the image processor is configured to determine corrections of the partial volume correction map as a partial volume artifact by location for the object of the patient, the corrections comprising a gain counteracting the partial volume effect.

12. The multi-modal imaging system of claim 1 wherein the image processor is configured to generate the sub-parts by random sub-division of the organ segmentation, is configured to generate the partial volume correction map by assignment of test activity to each of the sub-parts and forward project the test activities to an object space, wherein the random sub-division comprises random selection of locations and assignment of volume shapes centered at the randomly selected locations with a maximum size that does not overlap other ones of the volume shapes and are within the organ.

* * * * *